United States Patent [19]

Kautz, Jr.

[11] 4,050,991
[45] Sept. 27, 1977

[54] PYROLYTIC REDUCER AND CONDENSER APPARATUS

[76] Inventor: Walter C. Kautz, Jr., 21707 NW. 51st Ave., Ridgefield, Wash. 98646

[21] Appl. No.: 679,704

[22] Filed: Apr. 23, 1976

[51] Int. Cl.² .................. C10B 1/04; C10B 53/00
[52] U.S. Cl. .................................. 202/99; 201/25; 201/30; 201/37; 202/120
[58] Field of Search ............... 202/120, 124, 187, 189, 202/158, 153, 96, 105, 99; 201/2.5, 25, 30, 37; 48/209, 111

[56] References Cited

U.S. PATENT DOCUMENTS

| 2,357,869 | 9/1944 | Beckwith | 202/187 X |
| 2,607,666 | 8/1952 | Martin | 202/120 X |
| 3,501,394 | 3/1970 | Lyons | 202/120 X |

FOREIGN PATENT DOCUMENTS

| 735,741 | 5/1943 | Germany | 202/120 |

Primary Examiner—Morris O. Wolk
Assistant Examiner—Arnold Turk
Attorney, Agent, or Firm—James D. Givnan, Jr.

[57] ABSTRACT

A pyrolitic reducer and condenser apparatus within which waste material is reduced to char and volatiles with provision made for collecting heavy and light volatiles for their reuse. A reduction bin receives waste material which is reduced by a low oxygen heat flow passing downwardly through the bin. A lower bin portion intermittently discharges the resulting char while volatile matter passes outwardly and then upwardly along a condenser wall whereat heavier oils are condensed out. The condenser structure additionally includes an insulative member confining heat within the reduction bin. Lighter oils are condensed by water cooled surfaces within an upper, baffle equipped condenser portion. Provision is made for elevating of the condenser structure for periodic access to the reduction bin. A feed assembly embodies an air lock to enable the intermittent discharge of waste into the reduction bin while preventing the escape of reduction gases. Fluid barriers about the lower end of the condenser and about a central burner duct also prevent the escape of such gases.

11 Claims, 3 Drawing Figures

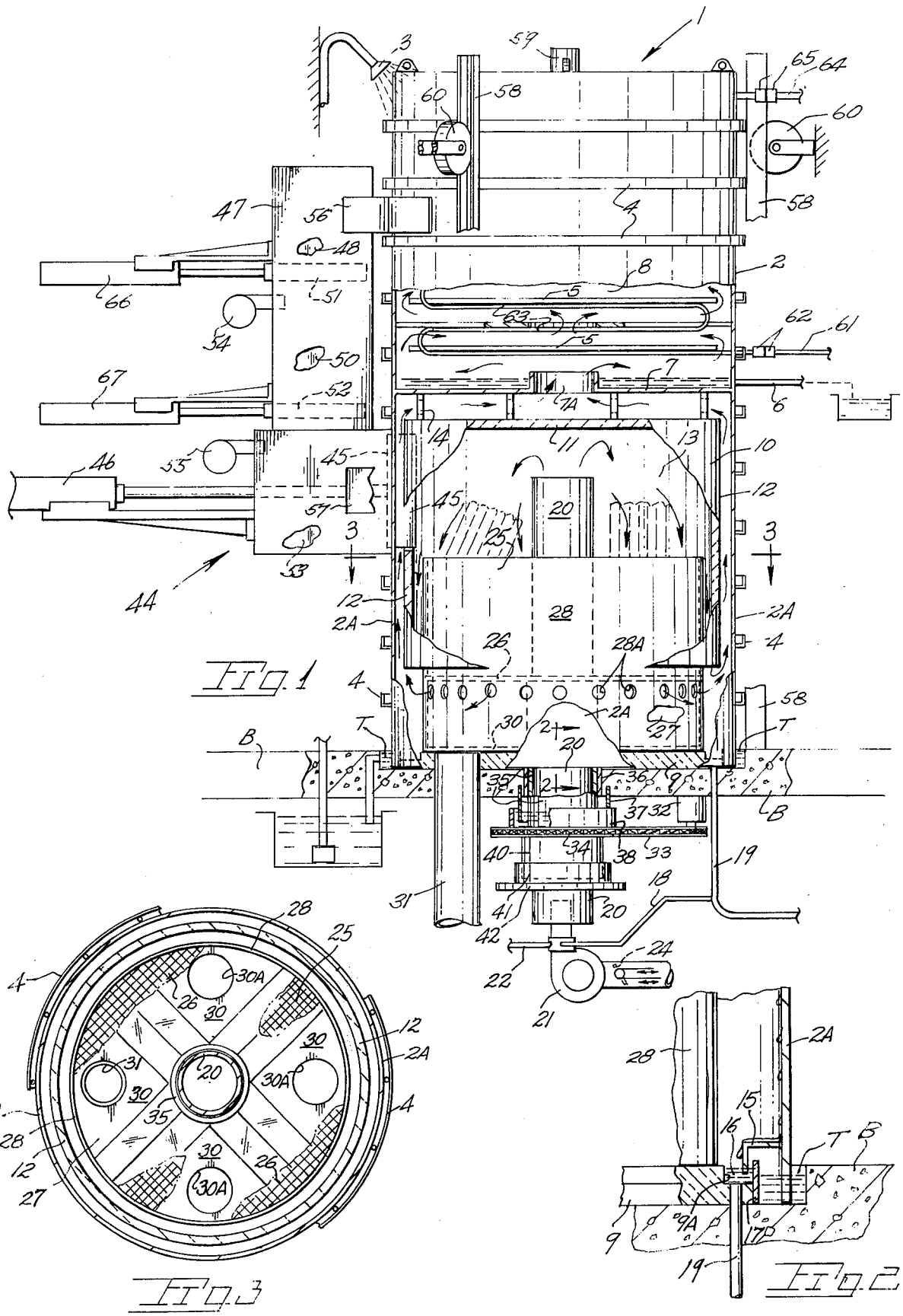

4,050,991

PYROLYTIC REDUCER AND CONDENSER APPARATUS

BACKGROUND OF THE INVENTION

The present invention relates generally to a reduction type furnace and particularly to one including a condenser arrangement for collecting volatile gases permitting clean furnace operation.

Well recognized is the problem of disposal of industrial and domestic wastes. A particular troublesome problem is the disposal of used tires and other rubber products. Efforts to dispose of same have included the use of machines reducing the tire to a commuted state for subsequent processing. The rubber so salvaged may be treated and reused, in some instances, in the production of new rubber products. From a practical aspect, however, a significant problem remains unsolved i.e., the reduction of used tires on a widespread basis. At present, large quantities of salvaged rubber products are still being disposed of in the same old way, such as into landfills. Air quality requirements, where in force, prevent the burning of tires, with ground burial of tires being unsatisfactory by reason of later settling resulting from decomposition as well as a limited number of landfill sites.

While the reduction and reuse of rubber products have been contemplated, efforts have largely been limited to experiments under ideal laboratory conditions which do not lend themselves to widespread practice.

SUMMARY OF THE PRESENT INVENTION

The present invention concerns a pyrolitic reducer and condenser of novel construction enabling the reduction of salvaged waste including uses of rubber tires which are reduced to their basic constituents for subsequent reuse.

The present reducing apparatus includes a furnace with a low oxygen environment having a receptacle for the waste products being reduced. A burner exhaust flow is directed uniformly through the waste with the resulting char being intermittently discharged. A condenser arrangement includes a skirt portion for collecting and ultimately directing the gases upwardly into a secondary condenser where lighter oil constituents are removed from the flow. A water seal about the skirt perimeter in combination with fluid collector means assures against the escape of combustion products. The condenser and its skirt are cooled by a circulating water flow to promote condensation of heavy oils along the condenser skirt while a secondary condenser removes remaining condensibles and lighter oils. Gas emitted from said secondary condenser may be utilized for fueling the apparatus. For periodic removal of metal residue, the condenser is removably mounted over the reducer for access to a reduction bin. For removal of char, the bin may be intermittently positioned over a discharge chute. A centrally located chimney serves to centrally locate the bin. A reverse flow of burner gases flows through the bin contents. Seal means about the chimney prevent blow-by of furnace gases. A feed assembly enables waste to be loaded during burner operation. An insulative skirt below the condenser serves to redirect a furnace flow downwardly through the bin contained waste matter and secondly, isolates a condenser surface from elevated temperatures.

Important objects of the invention include: the provision of an apparatus for both the reduction of waste material and the collection of volatiles and char therefrom; the provision of an apparatus the simplified construction and operation of which renders the same practical for operation by those of ordinary skill; the provision of an apparatus reducing waste to easily handled char and reusable volatiles; the provision of an apparatus which may use a portion of reclaimed volatiles for its fuel; the provision of an apparatus having a condensor of unique configuration additionally having insulative qualities to isolate certain condenser surfaces from high temperatures; the provision of an apparatus having a bin through which a reverse burner flow passes with debris being collected on a bin grate surface with the char being collected within a lower bin portion; the provision of an apparatus utilizing water seals to prevent the escape of low pressure gases to the atmosphere; the provision of an apparatus including a loading assembly for the periodic feeding of waste material while avoiding leakage to the atmosphere of combustion products; the provision of a condenser having a continuous water bath over its exterior for condensation purposes; and the provision of an apparatus having low operating pressures to diminish the chance of air escape and ambient air contamination.

BRIEF DESCRIPTION OF THE DRAWINGS

In the accompanying drawings:

FIG. 1 is an elevational view of the present apparatus with wall fragments broken away for purposes of illustration;

FIG. 2 is a vertical elevational view taken along line 2—2 of FIG. 1 showing details of a water seal and collector means; and FIG. 3 is a horizontal sectional view taken downwardly along line 3—3 of FIG. 1 showing bin details.

DETAILED DESCRIPTION OF THE PREFERRED EMBODIMENT

With continuing reference to the accompanying drawings wherein applied reference numerals indicate parts similarly identified in the following specification, the reference numeral 1 indicates generally a condenser structure having an upper exterior wall 2 with a skirt portion at 2A. The exterior of wall 2 and its skirt portion 2A are continuously subjected to a cooling medium such as water sprayed from spray heads as at 3. The downward flow of water is evenly distributed about walls 2 and 2A by means of rings 4, each having a series of apertures for water dispersal purposes.

The upper portion of the condenser houses a series of baffles as at 5 which serve to direct upward flowing gases into serpentine inpingement against inner, condensing surfaces of wall 2. An inlet at 7A in the bottom wall 7 of the condenser admits the products of combustion and volatiles suspended therein into the upper condenser area at 8. Light oils condensed in the upper portion of the condenser are routed via a conduit 6 to a suitable storage receptacle.

Disposed below the upper condenser structure is an insulative structure 10 including a top wall 11 and a circular side wall 12 with top wall 11 defining the upper limit of a reduction chamber 13. Port defining connectors at 14 permit inward passage of combustion products (per applied arrows) for entry into the upper condenser area 8 and additionally serve to suspend insulative structure 10 from a bottom wall 7 of the condenser.

Outwardly spaced from structure 10 is condenser skirt 2A which terminates downwardly in a fluid filled trough T provided for condenser sealing purposes. A base B is recessed to receive an insulative base at 9. The interior surface of skirt 2A acts on products of combustion and suspended volatiles moving therealong to condense same. A collector arrangement is provided interiorly of the lower portion of the skirt, as best viewed in FIG. 2, wherein an inwardly projecting flange 15 serves to direct condensation products into an annular trough 16 defined by a shouldered rim 9A of base 9 with a barrier 17 extending thereabout. Condensation collecting on the shouldered base 9 is removed through a conduit 19 leading to a storage receptacle with a branched line at 18 bleeding off gases which may be burned in the apparatus's burner as later described.

Indicated at 20 is an exhaust duct for the discharge from a burner assembly 21. Duct 20 discharges into reduction chamber 13 whereat the reverse or downward flow passes through the reduction chamber subjecting waste material therein to elevated temperatures in a restricted oxygen environment. Burner 21, at the lower end of the duct, is fired by gas generated from the reduction of waste material with an alternative source of fuel provided by a line 22 in communication with a fuel source. Burner 21 has a controlled air supply via a damper 24.

Disposed about exhaust duct 20 is a reduction bin structure 25, as best viewed in FIG. 3, having a waste supporting grate 26 and a subsequent receptacle area at 27 which serves to receive the char from reduced waste on grate 26. The circular bin wall at 28 is apertured at 28A to provide gas exit ports permitting reduction gases to flow outwardly and thence upwardly along condenser skirt wall 2A as per the applied arrows. A bin bottom wall at 30 is supported on insulative base 9 and defines openings at 30A for periodic discharge of char into ash chute 31 for purposes of char removal. The receptacle portion of the reduction bin may be provided with inclined interior walls facilitating char discharge. Bottom wall openings at 30A are intermittently indexed into registration with ash chute 31 for char discharge.

Imparting intermittent rotation to bin 25 is a gear head motor 32 in bin driving engagement via power transmission means including a chain and sprocket arrangement at 33 and 34, the sprocket being affixed to a downwardly extending bin extension or collar 35 circumposed in a rotatable manner about exhaust duct 20. Intermittent actuation of motor 32 as by a timing device serves to index bin 25 so as to sequentially align each opening 30A of the bin with ash chute 31 while at other times locating floor 30 so as to close off the ash chute. A bearing sleeve 36 in supporting base B for the apparatus journals collar 35 of the bin structure.

To provide a seal against blow-by gases which otherwise may escape downwardly past sleeve 36, a collar 37 is provided which depends from base B and constitutes part of a first circular fluid barrier which also includes an outer, concentric wall 38. Means forming an annularly shaped fluid barrier includes a sprocket 34 secured to bin collar 35 in a water-tight manner whereby the sprocket, wall 38 and the outer surface of collar 35 will confine an annularly shaped fluid barrier into which collar 37 depends to internally confine escaping gases. A second blow-by fluid barrier is embodied within a collar 40 depending from sprocket 34 for submergence of its lower periphery within a body of fluid outwardly confined by an outer concentric wall 41, inwardly by the wall surface of duct 20 and downwardly by flange 42 secured to duct 20.

A waste feed assembly is indicated generally at 44 and includes a reciprocal member 45 actuated by a power source 46 for the discharge of waste articles through corresponding openings in condenser wall 2A and side wall 12 of insulative structure 10. In the FIG. 1 position shown, member 45 normally occupies the corresponding openings in wall 2A and insulative wall 12 to prevent the escape of gases. For depositing waste into bin 25 I provide an air lock arrangement including a chute 47 with chambers 48 and 50 defined therewithin by cylinder positioned closure plates 51 and 52. Chamber 50, as well as loading chamber 53, are provided with a source of pressurized air by means of blowers 54 and 55 which prevents escape of reduction gases during the loading sequence. Loading chamber 50 is isolated during a loading operation by closure plates 51 and 52, cylinder actuated at 66 and 67, whereafter retraction of plate 52 results in deposit of the waste articles into chamber 53 for subsequent discharge into bin 25 upon outward actuation of loading member 45. Connector plates 56 and 57 attach the feed assembly to the condenser structure thereby obviating any alignment problems which might have resulted from intermittent raising of condenser structure 2.

For purposes of lifting condenser structure 2, a series of guide rails 58 are in supported disposition about the condenser outer wall while rollers at 60 confine the rails and condenser structure for vertical travel by a lifting instrumentality not shown. Such lifting enables periodic removal of non-combustible material such as steel tire components and the like.

Gases exhausting an outlet at 59 may be fed back to burner 21, burned off or routed through a scrubber arrangement prior to return to the atmosphere.

The present condenser structure 2 is readily adaptable for use as a heat exchanger for heating a circulating fluid which enters the structure via an inlet conduit 61 and a quick disconnect type coupling 62 with an internal coil being indicated at 63. The heated fluid is discharged via conduit 64 receiving fluid through a quick disconnect type coupling 65. Water heated by means of the above described arrangement may be used in the hydroponic growth of plant matter with the present apparatus providing a low cost heat source.

In one sequence of operation, the material to be reduced is loaded into reduction bin 25 by operation of feed assembly 44. Heat is initially applied to the bin contents by means of burner 21 with damper 24 being regulated to provide a resulting heat flow low in oxygen. Temperatures within the reduction bin will vary from top to bottom resulting in the waste material charring to the extent that substantially all such material is reduced to char and passes through grate 26 into the lower portion of the bin. In some instances, where char is undesired, the flow of oxygen in heat duct 20 may be increased to permit burning of the waste material to an ash state. The heat flow escaping from the bin, via ports 28A, carries suspended volatiles, the heavier of which will condense out as the heat flow moves upwardly along the inner surface of condenser skirt 2A. These heavier oils are removed via the arrangement shown in FIG. 2. Lighter oils are condensed out within the baffle equipped, upper portion of the condenser as the heat flow passes into contact against the inner surface of condenser wall 2. Such lighter oils are removed via conduit 6. The fluid flow from spray heads as at 3 continuously bathes the condenser exterior with dispersal rings 4 serving to distribute the fluid about the condenser exterior. Insulative structure 10 depending from the condenser serves to isolate, to a large extent, reduction bin temperatures from the condenser exterior.

While I have shown but one embodiment of the invention, it will be apparent to those skilled in the art that the invention may be embodied still otherwise without departing from the spirit and scope of the invention.

Having thus described the invention, what is desired to be secured under a Letters Patent is:

1. A pyrolytic reducer and condenser apparatus for the reduction of waste material and condensation of resulting volatiles, said apparatus comprising in combination,
   a reduction bin for the reception of waste articles to be reduced, said bin having a side wall with outlet ports and a floor,
   an insulative member having a top wall and a side wall and circumposed in a spaced apart manner about at least a portion of the side wall of said bin,
   a regulatable reduction heat source including a duct having a discharge end providing a controlled upward heat flow into said insulative member against the top wall thereof, said reduction bin being disposed below the discharge end of said duct and receiving a redirected downward heat flow,
   condenser means receiving the heat flow passing downwardly intermediate the reduction bin and insulative member side wall along with the heat flow and waste material volatiles suspended therein discharged through said reduction bin ports for the recovery of condensibles from the reduction flow.

2. The apparatus claimed in claim 1 additionally including a feed assembly including a reciprocable member for discharging waste material into the reduction bin.

3. The apparatus claimed in claim 2 wherein said feed assembly includes multiple loading chambers, an air lock arrangement for said loading chambers including independently actuable closure plates.

4. The apparatus claimed in claim 3 additionally including means pressurizing at least some of said loading chambers with ambient air.

5. The apparatus claimed in claim 1 wherein said condenser means includes a skirt portion disposed about the insulative member in a radially spaced apart manner and redirecting the reduction flow.

6. The apparatus claimed in claim 5 wherein said condenser means includes heat exchanger means for heating a transient fluid flow.

7. The apparatus claimed in claim 5 wherein said bin is concentric with said duct and said floor includes a depending collar portion rotatably disposed about said duct, powered means in driving engagement with said collar portion for imparting rotary motion to said bin said bin floor having ash discharge openings therein for progressive registration with an ash receiving chute.

8. The apparatus claimed in claim 7 wherein said depending collar portion of said bin include means forming an annularly shaped fluid barrier confining blow-by gases moving along the duct exterior.

9. The apparatus claimed in claim 5 wherein said condenser skirt portion terminates in a lower rim for submergence within a fluid filled trough to confine gases within the apparatus and wherein the exterior of said condenser means is subjected to a coolant flow.

10. The apparatus claimed in claim 9 additionally including guide means on said condenser means confining the condenser means for vertical travel, said condenser adapted to be vertically positioned permitting access to said reduction bin.

11. The apparatus claimed in claim 10 wherein said insulative member is integral with the condenser means so as to be removable therewith to provide access to the reduction bin.

* * * * *